Patented Oct. 26, 1954

2,692,885

UNITED STATES PATENT OFFICE 2,692,885

POLYHALOGENATED DIBENZANTHRONES AND ISODIBENZANTHRONES AND A METHOD FOR THEIR PRODUCTION

Guido R. Genta, Hillside, N. J., assignor to General Aniline & Film Corporation, New York, N. Y., a corporation of Delaware No Drawing. Application October 11, 1950, Serial No. 189,678

10 Claims. (Cl. 260—356)

The present invention relates to polybrominated dibenzanthrones and isodibenzanthrones containing at least 3 atoms of bromine and which are substantially free from any other halogen, and to a method of producing such compounds.

It has been proposed in the past to polybrominate dibenzanthrones and isodibenzanthrones by subjecting the same to the action of a halogen while dissolved in a solvent such as chlorsulfonic acid and in the presence of a halogen carrier. This procedure always leads to the formation of polybrominated products containing very substantial quantities of chlorine.

United States Letters Patent 1,882,285, granted to Max Albert Kunz et al. on October 11, 1932, for example, describes the production of dibenzanthrones and isodibenzanthrones containing up to 5 halogen atoms. In the procedure of the patent, the parent vat dyestuff is halogenated while dissolved in chlorsulfonic acid, and while using sulfur, selenium, antimony or the like, as the halogen carrier. It is stated by the patentee that when brominating the parent vat in chlorosulfonic acid, the products obtained contain chlorine in addition to bromine.

Thus, in Example 1, the product is trihalogenated but contains only 2 atoms of bromine; in Example 3 the product is hexahalogenated but contains only four atoms of bromine; in Example 5 the product is pentahalogenated and contains 3 atoms of bromine, and in Example 17 the product is pentabrominated but contains, in addition, a few percent of chlorine.

It is, therefore, evident that where products containing 3 to 5 atoms of bromine are produced by the patentee, they inevitably contain relatively large amounts of chlorine.

I have now discovered that tri- to pentabrominated dibenzanthrones and isodibenzanthrones, substantially free from chlorine, may be obtained by brominating dibenzanthrone, isodibenzanthrone or 2,2'-dibenzanthronyl in a melt derived from an anhydrous aluminum halide and salt, and in the presence of a small amount of a halogen carrier. The aforesaid polybrominated dibenzanthrones and isodibenzanthrones, and the method for their production, constitute the purposes and objects of the present invention.

The melt in which bromination of the parent vat dye is effected is obtained by mixing an anhydrous aluminum halide, such as aluminum chloride or aluminum bromide and salt, and heating the mixture until it becomes a uniform melt.

I have ascertained, and this is a valuable feature of my invention, that melts which are uniform and very thin at low temperatures, i. e. 60 to 80° C. are produced if the aluminum halide and salt be added to a tertiary base which is liquid at the above temperatures prior to fusing the components. The provision of such a thin melt has the advantage that it minimizes losses by bromine by permitting its addition at low temperatures and by insuring thorough mixing of the fluid mass during bromination.

Examples of tertiary bases which may be employed are pyridine, α-picoline, quinoline, dimethylaniline, diethylaniline, triethylamine, and the like.

The temperature to which the above components are heated to form the melt will be one which will insure complete fusion of the components. This temperature may vary, but generally will be about 100° C.

The melt obtained as indicated is used to dissolve the parent vat dyestuff therein at a temperature of about 100° C. The melt is then cooled to about 60 to 90° C., at which point the halogen carrier is added. The bromine is then added slowly to the melt and the melt held at the indicated temperature for a time, after which it is heated to a higher temperature, say about 120 to 130° C. to insure completion of the bromination.

The quantity of the halogen carrier employed is relatively small, amounting to no more than about 3 to 5% by weight of the material brominated. Suitable halogen carriers are iodine, ferric chloride, antimony chloride, sulfur, selenium or the like. As a matter of fact, any of the usual halogen carriers employed in the halogenation of vat dyes may be employed.

It has been indicated above that the desired polybrominated materials may be obtained from 2,2'-dibenzanthronyl, as well as from dibenzanthrone or isodibenzanthrone. This result is achieved by effecting simultaneous ring closure and completion of the bromination by means of an oxidizing agent such as sodium nitrate, potassium nitrate, sodium nitrite, potassium nitrite, p-nitrobenzenesulfonic acid, m-nitrobenzenesulfonic acid or the like. The utilization of the 2,2'-dibenzanthronyl presents the particular advantage in that it provides a one-step reaction which yields a pure and cheaper product.

The polybrominated materials contemplated herein are, as indicated, substantially free from chlorine. By this it is meant that none of the products contain more than 1% of chlorine in any case. Any chlorine present appears to be attributable to the action of aluminum chloride when the same is used in forming the melt. If the aluminum chloride be replaced by aluminum bromide, then the resulting products are completely free from chlorine.

The differences in the quantity of chlorine in my products as compared to those described in United States Letters Patents 1,855,295 and 1,882,285 are reflected by a material difference in properties between my products and those of the prior art. This distinction will become more apparent as the description proceeds.

The invention is further illustrated by the following examples, in which the parts are by weight unless otherwise stated. It is to be understood that the invention is not restricted thereto.

Example 1

46 grams of dibenzanthrone are dissolved in a melt prepared by adding a mixture of 300 grams of anhydrous $AlCl_3$ and 45 grams of salt to 30 cc. of pyridine, and maintained at 100° C. When the mass is uniform, it is cooled to 80 to 90° C. 2 grams of iodine are added, followed by 37 grams of bromine which are added over one hour.

After agitating for one hour at 90° C., it is heated to 125° C. and held for two hours. 12 grams of sodium nitrate are introduced over two hours and the temperature raised to 140° C.

The melt is drowned and boiled with dilute HCl. The product obtained in quantitative yields consists mainly of a tribromodibenzanthrone having a bromine content of 35%.

The following indicates the differences in properties between the product obtained as above, and the tribromodibenzanthrone of United States Letters Patent 1,855,295:

| | | U. S. P. 1,855,295 | Example 1 |
|---|---|---|---|
| Tribromodibenzanthrone | $H_2SO_4$ | Red violet | Violet. |
| | $+HNO_3$ | Olive green | Olive. |
| | Vat | Blue | Red violet. |

Example 2

The procedure is the same as in Example 1, excepting that the amount of bromine is increased to 70 grams. A compound is obtained which contains about 42% of bromine. It is a tetrabromodibenzanthrone containing not more than 1% of chlorine.

The following comparison shows a difference in properties between the tetrabrome derivative obtained above, and the tetrabromodibenzanthrone of U. S. P. 1,855,295:

| | | U. S. P. 1,855,295 | Example 2 |
|---|---|---|---|
| Tetrabromodibenzanthrone | $H_2SO_4$ | Red violet | Pure blue. |
| | $+HNO_3$ | Olive | Olive green. |
| | Vat | Pure blue | Violet. |

Example 3

The procedure is the same as in Example 1, excepting that the dibenzanthrone is replaced by isodibenzanthrone and the bromine is increased to 70 grams. The resulting compound contains 40% bromine and is a tetrabromoisoviolanthrene containing less than 1% of chlorine. The difference in properties between such tetrabrome derivative and that of U. S. P. 1,855,295 is indicated by the following comparison:

| | | U. S. P. 1,855,295 | Example 3 |
|---|---|---|---|
| Tetrabromoisodibenzanthrone | $H_2SO_4$ | Green | Olive. |
| | $+HNO_3$ | Violet | Pale violet. |
| | Vat | Reddish blue. | Greenish blue. |

Example 4

The procedure is the same as in Example 1, excepting that the amount of bromine is increased to 90 grams. The resulting product contains 49% of bromine and is pentabromodibenzanthrone containing less than 1% of chlorine.

The following comparison indicates the difference in properties between the above pentabrome derivative and that of Example 17 of U. S. P. 1,882,285:

| | | U. S. P. 1,882,285 | Example 4 |
|---|---|---|---|
| Pentabromodibenzanthrone | $H_2SO_4$ | Violet | Blue. |
| | Vat | do | Pure blue. |

Example 5

The procedure is the same as in Example 1, excepting that the aluminum chloride is replaced by aluminum bromide. The tribromo derivative thus obtained is completely free from chlorine.

Example 6

The procedure is the same as in Example 1, excepting that the dibenzanthrone is replaced by 2,2'-dibenzanthronyl, and the quantity of bromine is increased to 90 grams. The product obtained is a pentabromodibenzanthrone similar in properties to that of Example 4. It is to be pointed out that the sodium nitrate used in Example 1 to insure complete bromination operates in the procedure of this example to effect ring closure to the dibenzanthrone nucleus.

Example 7

The procedure is the same as in Example 4, excepting that the dibenzanthrone is replaced by isodibenzanthrone. The product is substantially pure pentabromoisodibenzanthrone. The product dissolves in concentrated sulfuric acid, to give a greenish, olive solution. It dyes cotton in violet shades from a blue vat having red fluorescence.

Various modifications of the invention will occur to persons skilled in the art. Thus it is evident that the products described above are not only vat dyes, but are equally useful as intermediates for the formation of other vat dyes, and in this connection attention is directed to the copending application of Paul Nawiasky and myself, Serial No. 187,363, filed September 28, 1950, and entitled "New Vat Grey to Black Dyestuffs Comprising Polyamino Dibenzanthrones, Isodibenzanthrones and Dibenzanthronyls." I, accordingly, do not intend to be limited in the patent granted, except as necessitated by the prior art and appended claims.

I claim:

1. The process of producing a compound selected from the class consisting of dibenzanthrone and isodibenzanthrone containing from 3 to 5 atoms of bromine and less than 1% of chlorine, which comprises dissolving a compound selected from the class consisting of dibenzanthrone, isodibenzanthrone, and 2,2'-dibenzanthronyl in a melt of an anhydrous aluminum halide and salt, subjecting the melt to the action of bromine and completing the bromination in the presence of an oxidizing agent.

2. The process of producing a compound selected from the class consisting of dibenzanthrone and isodibenzanthrone containing from 3 to 5 atoms of bromine and less than 1% of chlorine, which comprises adding an anhydrous aluminum halide and salt to a tertiary amine which is liquid at a temperature between 60 and 80° C., heating the mixture to produce a thin melt, dissolving in such melt a compound selected from the class consisting of dibenzanthrone, isodibenzanthrone and 2,2'-dibenzanthronyl, subjecting the melt to the action of bromine and completing the bromination in the presence of an oxidizing agent.

3. The process as defined in claim 1 wherein the oxidizing agent is sodium nitrate.

4. The process as defined in claim 2 wherein the oxidizing agent is sodium nitrate.

5. The method of producing a melt for use in the bromination of a compound selected from the class consisting of dibenzanthrone, isodibenzanthrone and 2,2'-dibenzanthronyl, which comprises adding a mixture comprising about 20 parts by weight of an anhydrous aluminum halide and about 3 parts by weight of salt to about 2 parts by weight of a tertiary amine which is liquid at a temperature of 60 to 80° C., and heating the mixture to produce a thin, uniform melt.

6. A thin uniform melt, liquid at a temperature of 60 to 80° C. and useful for the bromination of vat dyes containing as its essential components, an anhydrous aluminum halide, salt and a tertiary amine in respective weight proportions of about 20:3:2.

7. The process as defined in claim 1 wherein a small amount of a halogen carrier is dissolved in the melt.

8. The process as defined in claim 2 wherein a small amount of a halogen carrier is dissolved in the melt.

9. A method as defined in claim 5 wherein the tertiary amine is pyridine.

10. A composition as defined in claim 6 wherein the tertiary amine is pyridine.

References Cited in the file of this patent

UNITED STATES PATENTS

| Number | Name | Date |
|---|---|---|
| 1,882,285 | Kunz et al. | Oct. 11, 1932 |
| 1,926,050 | Kunz et al. | Sept. 12, 1933 |
| 1,949,209 | Kunz et al. | Feb. 27, 1934 |
| 1,982,313 | Kunz et al. | Nov. 27, 1934 |